US009742477B2

(12) United States Patent
Wu

(10) Patent No.: US 9,742,477 B2
(45) Date of Patent: Aug. 22, 2017

(54) DATA TRANSMISSION METHOD FOR MULTI-ANTENNA SYSTEM, AND DEVICE

(71) Applicant: Huawei Technologies Co., Ltd., Shenzhen (CN)

(72) Inventor: Yuchun Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 13 days.

(21) Appl. No.: 14/863,529

(22) Filed: Sep. 24, 2015

(65) Prior Publication Data

US 2016/0020836 A1  Jan. 21, 2016

Related U.S. Application Data

(63) Continuation of application No. PCT/CN2014/074211, filed on Mar. 27, 2014.

(30) Foreign Application Priority Data

Mar. 27, 2013 (CN) .......................... 2013 1 0102509

(51) Int. Cl.
*H04B 7/02* (2017.01)
*H04B 7/04* (2017.01)
(Continued)

(52) U.S. Cl.
CPC ......... *H04B 7/0469* (2013.01); *H04B 7/0456* (2013.01); *H04B 7/0697* (2013.01); *H04B 7/0885* (2013.01)

(58) Field of Classification Search
CPC ..... H04L 1/0618; H04L 1/06; H04L 25/0204; H04L 27/2647; H04L 5/0007;
(Continued)

(56) References Cited

U.S. PATENT DOCUMENTS

2008/0137762 A1    6/2008  Waters et al.
2013/0114578 A1*   5/2013  Lim ...................... H04B 7/022
                                                        370/336
(Continued)

FOREIGN PATENT DOCUMENTS

CN         101615942 A      12/2009
CN         102332965 A       1/2012
(Continued)

OTHER PUBLICATIONS

"Considerations on CSI Feedback Enhancements for High-Priority Antenna Configurations," 3GPP TSG-RAN WG1 #66, R1-112420, Alcatel-Lucent Shanghai Bell, Alcatel-Lucent, Agenda Item 6.6.2.1, Aug. 22-26, 2011, 8 pages.

*Primary Examiner* — Zewdu Kassa
(74) *Attorney, Agent, or Firm* — Slater Matsil, LLP

(57) ABSTRACT

Embodiments of the present invention provide a data transmission method for a multi-antenna system, and a device. The method includes: performing first precoding processing on to-be-sent data in a first antenna direction of a multi-antenna system to generate first data; performing second precoding processing on the first data in a second antenna direction of the multi-antenna system to generate second data; and sending the second data to a receive node through each antenna port of the multi-antenna system; wherein: when the first precoding processing is first transmit diversity processing, the second precoding processing is second transmit diversity processing or second transmit spatial multiplexing processing; when the first precoding processing is first transmit spatial multiplexing processing, the second precoding processing is second transmit diversity processing. The method and the device are used to send data by using antennas in multiple antenna directions in the multi-antenna system.

20 Claims, 5 Drawing Sheets

(51) Int. Cl.
*H04B 7/0456* (2017.01)
*H04B 7/06* (2006.01)
*H04B 7/08* (2006.01)

(58) Field of Classification Search
CPC ............ H04L 27/2657; H04L 27/2662; H04L 5/0048; H04L 25/4902; H04L 1/0009; H04L 1/0041; H04L 25/49; H04B 7/0417; H04B 7/0669; H04B 3/54
USPC ................ 375/267, 261, 259, 316, 295, 219
See application file for complete search history.

(56) References Cited

U.S. PATENT DOCUMENTS

2014/0219375 A1 8/2014 Zhu et al.
2014/0301492 A1* 10/2014 Xin ..................... H04B 7/0456
　　　　　　　　　　　　　　　　　　　375/267

FOREIGN PATENT DOCUMENTS

| CN | 102412885 A | 4/2012 |
| EP | 2555445 A1 | 2/2013 |
| WO | 2013000260 A1 | 1/2013 |

* cited by examiner

First antenna direction $y^{(0)}(i) \quad y^{(1)}(i) \quad y^{(2)}(i) \quad y^{(3)}(i)$ Second antenna direction $y^{(0,0)}(i) \quad y^{(0,1)}(i) \quad y^{(0,2)}(i) \quad y^{(0,3)}(i)$ $y^{(1,0)}(i) \quad y^{(1,1)}(i) \quad y^{(1,2)}(i) \quad y^{(1,3)}(i)$ $y^{(2,0)}(i) \quad y^{(2,1)}(i) \quad y^{(2,2)}(i) \quad y^{(2,3)}(i)$ $y^{(3,0)}(i) \quad y^{(3,1)}(i) \quad y^{(3,2)}(i) \quad y^{(3,3)}(i)$ 45-degree cross polarization Vertical polarization

DATA TRANSMISSION METHOD FOR MULTI-ANTENNA SYSTEM, AND DEVICE

CROSS-REFERENCE TO RELATED APPLICATIONS

This application is a continuation of International Application No. PCT/CN2014/074211, filed on Mar. 27, 2014, which claims priority to Chinese Patent Application No. 201310102509.2, filed on Mar. 27, 2013, both of which are hereby incorporated by reference in their entireties.

TECHNICAL FIELD

Embodiments of the present invention relate to communications technologies, and in particular, to a data transmission method for a multi-antenna system, and a device.

BACKGROUND

A multiple-input multiple-output (MIMO) antenna technology is a core technology among new generation wireless communications technologies. When a transmit node uses multiple antennas to send a resource, two schemes can be used: diversity and multiplexing.

A diversity scheme means that when using M antennas to send a resource, a transmit node provides a diversity based on the M antennas for the resource that needs to be sent, and sends different copies of the resource by using the M antennas, and a receive node combines the different copies of the resource that are received from the M antennas in the diversity into the required resource. When the diversity scheme is used, a high signal to interference plus noise ratio (SINR) may be generated at a receive end, thereby increasing a coverage distance, or increasing a transmission rate at a same coverage distance. In addition, in the diversity scheme, a receive node does not need to provide a measurement feedback on channel state information (CSI), thereby improving link robustness. Therefore, in a wireless communications system that uses a MIMO technology, a transmit diversity scheme is used as a mandatory multi-antenna transmission scheme.

In a current wireless communications system, only a one-dimensional antenna transmit diversity is achieved based on two or four antennas; however, for a wireless communications system that uses a two-dimensional array antenna, no multi-antenna transmit diversity scheme is available.

SUMMARY

Embodiments of the present invention provide a data transmission method for a multi-antenna system, and a device, so as to send data by using antennas in multiple antenna directions in a multi-antenna system.

A first aspect provides a data transmission method for a multi-antenna system, including:

performing first precoding processing on to-be-sent data in a first antenna direction of a multi-antenna system to generate first data, where the first antenna direction includes at least two antennas;

performing second precoding processing on the first data in a second antenna direction of the multi-antenna system to generate second data, where the second antenna direction includes at least two antennas; and sending the second data to a receive node through each antenna port of the multi-antenna system; where when the first precoding processing is first transmit diversity processing, the second precoding processing is second transmit diversity processing or second transmit spatial multiplexing processing; when the first precoding processing is first transmit spatial multiplexing processing, the second precoding processing is second transmit diversity processing.

In a first possible implementation manner of the first aspect, the performing second precoding processing on the first data in a second antenna direction of the multi-antenna system to generate second data includes:

mapping the first data to second mapping data at second data layers, where a quantity of the second data layers is not greater than a quantity of antennas in the second antenna direction; and performing the second precoding processing on the second mapping data to generate the second data.

With reference to the first possible implementation manner of the first aspect, in a second possible implementation manner, if the second precoding processing is the second transmit diversity processing, the mapping the first data to second mapping data at second data layers includes:

mapping the first data to the second mapping data at the second data layers, where each of the second data layers includes same data; and the performing the second precoding processing on the second mapping data to generate the second data includes:

performing second transmit diversity precoding processing on the second mapping data to generate the second data.

With reference to the second possible implementation manner of the first aspect, in a third possible implementation manner, the performing second transmit diversity precoding processing on the second mapping data to generate the second data includes:

performing, by using a second diversity precoding matrix with p rows and v columns, the second transmit diversity precoding processing on the second mapping data to generate the second data, where p is the quantity of antennas in the second antenna direction, v is the quantity of the second data layers, and v is not greater than p.

With reference to the first possible implementation manner of the first aspect, in a fourth possible implementation manner, if the second precoding processing is the second transmit spatial multiplexing processing, before the mapping the first data to second mapping data at second data layers, the method further includes:

dividing the first data into u pieces of second subdata, where a quantity u of the pieces of the second subdata is not greater than the quantity of the second data layers;

the mapping the first data to second mapping data at second data layers includes:

mapping the u pieces of second subdata to the second mapping data at the second data layers, and mapping each piece of the second subdata into one second data layer; and the performing the second precoding processing on the second mapping data to generate the second data includes:

performing second transmit spatial multiplexing precoding processing on the second mapping data to generate the second data.

With reference to the fourth possible implementation manner of the first aspect, in a fifth possible implementation manner, the performing second transmit spatial multiplexing precoding processing on the second mapping data to generate the second data includes:

performing, by using a second multiplexing precoding matrix with p rows and v columns, the second transmit spatial multiplexing precoding processing on the second mapping data to generate the second data, where p is the quantity of antennas in the second antenna direction, v is the quantity of the second data layers, and v is not greater than p.

With reference to any possible implementation manner of the first aspect to the fifth possible implementation manner of the first aspect, in a sixth possible implementation manner, the performing first precoding processing on to-be-sent data in a first antenna direction of a multi-antenna system to generate first data includes:

if the first precoding processing is the first transmit diversity processing, mapping the to-be-sent data to first mapping data at first data layers, where a quantity of the first data layers is not greater than a quantity of antennas in the first antenna direction; and performing, by using a first diversity precoding matrix, first transmit diversity precoding processing on the first mapping data to generate the first data; or if the first precoding processing is the first transmit spatial multiplexing processing, dividing the to-be-sent data into w pieces of first subdata, where a quantity w of the pieces of the first subdata is not greater than a quantity of first data layers, and the quantity of the first data layers is not greater than a quantity of antennas in the first antenna direction; mapping the w pieces of first subdata to first mapping data at the first data layers, and mapping each piece of the first subdata into one first data layer; and performing, by using a first multiplexing precoding matrix, first transmit spatial multiplexing precoding processing on the first mapping data to generate the first data.

With reference to any possible implementation manner of the first aspect to the sixth possible implementation manner of the first aspect, in a seventh possible implementation manner, the method further includes that:

the first antenna direction and the second antenna direction are spatially orthogonal to each other; or the first antenna direction and the second antenna direction are cross polarized at 45 degrees; or the first antenna direction and the second antenna direction are vertically polarized.

With reference to any possible implementation manner of the first aspect to the seventh possible implementation manner of the first aspect, in an eighth possible implementation manner, the method further includes:

sending the quantity of the first data layers and the quantity of the second data layers to the receive node by using signaling.

With reference to any possible implementation manner of the first aspect to the eighth possible implementation manner of the first aspect, in a ninth possible implementation manner, the method further includes:

performing the first precoding processing on a reference signal in the first antenna direction, and performing the second precoding processing on the reference signal in the second antenna direction, so as to generate a precoded reference signal; and sending the precoded reference signal to the receive node.

With reference to the ninth possible implementation manner of the first aspect, in a tenth possible implementation manner, the reference signal is at least one of a CRS, a CSI-RS, and a DM-RS.

A second aspect provides a data transmission method for a multi-antenna system, including:

receiving second data that is sent by a transmit node by using a multi-antenna system, where the second data is generated by the transmit node after the transmit node performs second precoding processing on first data in a second antenna direction of the multi-antenna system, and the second antenna direction includes at least two antennas;

performing second decoding processing on the second data to acquire the first data, where the first data is generated by the transmit node after the transmit node performs first precoding processing on to-be-sent data in a first antenna direction of the multi-antenna system, and the first antenna direction includes at least two antennas; and performing first decoding processing on the first data to acquire the to-be-sent data; where when the first decoding processing is first receive diversity processing, the second decoding processing is second receive diversity processing or second receive spatial multiplexing processing; when the first decoding processing is first receive spatial multiplexing processing, the second decoding processing is second receive diversity processing.

In a first possible implementation manner of the second aspect, the performing second decoding processing on the second data to acquire the first data includes:

performing the second decoding processing on the second data to generate second mapping data at second data layers; and performing an inverse mapping operation on the second mapping data according to a quantity of the second data layers to generate the first data, where the quantity of the second data layers is not greater than a quantity of antennas in the second antenna direction.

With reference to the first possible implementation manner of the second aspect, in a second possible implementation manner, if the second decoding processing is the second receive diversity processing, the performing the second decoding processing on the second data to generate second mapping data at second data layers includes:

performing second receive diversity decoding processing on the second data to generate the second mapping data at the second data layers, where each of the second data layers includes same data.

With reference to the second possible implementation manner of the second aspect, in a third possible implementation manner, the performing second receive diversity decoding processing on the second data to generate the second mapping data at the second data layers includes:

performing, by using a second diversity precoding matrix with p rows and v columns, the second receive diversity decoding processing on the second data to generate the second mapping data at the second data layers, where p is the quantity of antennas in the second antenna direction, v is the quantity of the second data layers, and v is not greater than p.

With reference to the first possible implementation manner of the second aspect, in a fourth possible implementation manner, if the second decoding processing is the second receive spatial multiplexing processing, the performing the second decoding processing on the second data to generate second mapping data at second data layers includes:

performing second receive spatial multiplexing decoding processing on the second data to generate the second mapping data at the second data layers, where each of the second data layers includes different data; and the performing an inverse mapping operation on the second mapping data according to a quantity of the second data layers to generate the first data includes:

performing the inverse mapping operation on the second mapping data according to the quantity of the second data layers to generate u pieces of second subdata, where a quantity u of the pieces of the second subdata is not greater than the quantity of the second data layers; and combining the u pieces of second subdata into the first data.

With reference to the fourth possible implementation manner of the second aspect, in a fifth possible implementation manner, the performing second receive spatial multiplexing decoding processing on the second data to generate the second mapping data at the second data layers includes:

performing, by using a second multiplexing precoding matrix with p rows and v columns, the second receive spatial multiplexing decoding processing on the second data to generate the second mapping data at the second data layers, where p is the quantity of antennas in the second antenna direction, v is the quantity of the second data layers, and v is not greater than p.

With reference to any possible implementation manner of the second aspect to the fifth possible implementation manner of the second aspect, in a sixth possible implementation manner, the performing first decoding processing on the first data to acquire the to-be-sent data includes:

if the first decoding processing is the first receive diversity processing, performing, by using a first diversity precoding matrix, first receive diversity decoding processing on the first data to generate the first mapping data; and performing an inverse mapping operation on the first mapping data to generate the to-be-sent data; or if the first decoding processing is the first receive spatial multiplexing processing, performing, by using a first multiplexing precoding matrix, first receive spatial multiplexing decoding processing on the first data to generate the first mapping data; performing an inverse mapping operation on the first mapping data according to a quantity of the first data layers to generate w pieces of first subdata, where a quantity w of the pieces of the first subdata is not greater than the quantity of the first data layers; and combining the w pieces of first subdata into the to-be-sent data.

With reference to any possible implementation manner of the second aspect to the sixth possible implementation manner of the second aspect, in a seventh possible implementation manner, the method further includes that:

the first antenna direction and the second antenna direction are spatially orthogonal to each other; or the first antenna direction and the second antenna direction are cross polarized at 45 degrees; or the first antenna direction and the second antenna direction are vertically polarized.

With reference to any possible implementation manner of the second aspect to the seventh possible implementation manner of the second aspect, in an eighth possible implementation manner, the method further includes:

receiving the quantity of the first data layers and the quantity of the second data layers that are sent by the transmit node by using signaling.

With reference to any possible implementation manner of the second aspect to the eighth possible implementation manner of the second aspect, in a ninth possible implementation manner, the method further includes:

receiving a precoded reference signal sent by the transmit node, where the reference signal is generated by the transmit node after the transmit node performs the first precoding processing on a reference signal in the first antenna direction and performs the second precoding processing on the reference signal in the second antenna direction.

With reference to the ninth possible implementation manner of the second aspect, in a tenth possible implementation manner, the reference signal is at least one of a CRS, a CSI-RS, and a DM-RS.

A third aspect provides a transmit node, including:

a first processing module, configured to perform first precoding processing on to-be-sent data in a first antenna direction of a multi-antenna system to generate first data, where the first antenna direction includes at least two antennas;

a second processing module, configured to perform second precoding processing on the first data in a second antenna direction of the multi-antenna system to generate second data, where the second antenna direction includes at least two antennas; and a sending module, configured to send the second data to a receive node through each antenna port of the multi-antenna system; where when the first precoding processing is first transmit diversity processing, the second precoding processing is second transmit diversity processing or second transmit spatial multiplexing processing; when the first precoding processing is first transmit spatial multiplexing processing, the second precoding processing is second transmit diversity processing.

In a first possible implementation manner of the third aspect, the second processing module includes:

a second mapping unit, configured to map the first data to second mapping data at second data layers, where a quantity of the second data layers is not greater than a quantity of antennas in the second antenna direction; and a second precoding unit, configured to perform the second precoding processing on the second mapping data to generate the second data.

With reference to the first possible implementation manner of the third aspect, in a second possible implementation manner, if the second precoding processing is the second transmit diversity processing, the second mapping unit is specifically configured to map the first data to the second mapping data at the second data layers, where each of the second data layers includes same data; and the second precoding unit is specifically configured to perform second transmit diversity precoding processing on the second mapping data to generate the second data.

With reference to the second possible implementation manner of the third aspect, in a third possible implementation manner, the second precoding unit is specifically configured to perform, by using a second diversity precoding matrix with p rows and v columns, the second transmit diversity precoding processing on the second mapping data to generate the second data, where p is the quantity of antennas in the second antenna direction, v is the quantity of the second data layers, and v is not greater than p.

With reference to the first possible implementation manner of the third aspect, in a fourth possible implementation manner, if the second precoding processing is the second transmit spatial multiplexing processing, the second mapping unit is specifically configured to divide the first data into u pieces of second subdata, where a quantity u of the pieces of the second subdata is not greater than the quantity of the second data layers; and map the u pieces of second subdata to the second mapping data at the second data layers, and map each piece of the second subdata into one second data layer; and the second precoding unit is specifically configured to perform second transmit spatial multiplexing precoding processing on the second mapping data to generate the second data.

With reference to the fourth possible implementation manner of the third aspect, in a fifth possible implementation manner, the second precoding unit is specifically configured to perform, by using a second multiplexing precoding matrix with p rows and v columns, the second transmit spatial multiplexing precoding processing on the second mapping data to generate the second data, where p is the quantity of antennas in the second antenna direction, v is the quantity of the second data layers, and v is not greater than p.

With reference to any possible implementation manner of the third aspect to the fifth possible implementation manner of the third aspect, in a sixth possible implementation manner, the first processing module includes: a first mapping unit and a first precoding unit; where if the first precoding processing is the first transmit diversity processing, the first mapping unit is configured to map the to-be-sent data to first mapping data at first data layers, where a quantity of the first data layers is not greater than a quantity of antennas in the first antenna direction; and the first precoding unit is configured to perform, by using a first diversity precoding matrix, first transmit diversity precoding processing on the first mapping data to generate the first data; or if the first precoding processing is the first transmit spatial multiplexing processing, the first mapping unit is configured to divide the to-be-sent data into w pieces of first subdata, where a quantity w of the pieces of the first subdata is not greater than a quantity of first data layers, and the quantity of the first data layers is not greater than a quantity of antennas in the first antenna direction, and map the w pieces of first subdata to first mapping data at the first data layers, and map each piece of the first subdata into one first data layer; and the first precoding unit is configured to perform, by using a first multiplexing precoding matrix, first transmit spatial multiplexing precoding processing on the first mapping data to generate the first data.

With reference to any possible implementation manner of the third aspect to the sixth possible implementation manner of the third aspect, in a seventh possible implementation manner, the transmit node further includes that:

the first antenna direction and the second antenna direction are spatially orthogonal to each other; or the first antenna direction and the second antenna direction are cross polarized at 45 degrees; or the first antenna direction and the second antenna direction are vertically polarized.

With reference to any possible implementation manner of the third aspect to the seventh possible implementation manner of the third aspect, in an eighth possible implementation manner, the transmit node further includes:

a signaling sending module, configured to send the quantity of the first data layers and the quantity of the second data layers to the receive node by using signaling.

With reference to any possible implementation manner of the third aspect to the eighth possible implementation manner of the third aspect, in a ninth possible implementation manner, the transmit node further includes:

a reference signal module, configured to perform the first precoding processing on a reference signal in the first antenna direction, and perform the second precoding processing on the reference signal in the second antenna direction, so as to generate a precoded reference signal; and send the precoded reference signal to the receive node.

With reference to the ninth possible implementation manner of the third aspect, in a tenth possible implementation manner, the reference signal is at least one of a CRS, a CSI-RS, and a DM-RS.

A fourth aspect provides a receive node, including:

a receiving module, configured to receive second data that is sent by a transmit node by using a multi-antenna system, where the second data is generated by the transmit node after the transmit node performs second precoding processing on first data in a second antenna direction of the multi-antenna system, and the second antenna direction includes at least two antennas;

a second processing module, configured to perform second decoding processing on the second data to acquire the first data, where the first data is generated by the transmit node after the transmit node performs first precoding processing on to-be-sent data in a first antenna direction of the multi-antenna system, and the first antenna direction includes at least two antennas; and a first processing module, configured to perform first decoding processing on the first data to acquire the to-be-sent data; where when the first decoding processing is first receive diversity processing, the second decoding processing is second receive diversity processing or second receive spatial multiplexing processing; when the first decoding processing is first receive spatial multiplexing processing, the second decoding processing is second receive diversity processing.

In a first possible implementation manner of the fourth aspect, the second processing module includes:

a second decoding unit, configured to perform the second decoding processing on the second data to generate second mapping data at second data layers; and a second mapping unit, configured to perform an inverse mapping operation on the second mapping data according to a quantity of the second data layers to generate the first data, where the quantity of the second data layers is not greater than a quantity of antennas in the second antenna direction.

With reference to the first possible implementation manner of the fourth aspect, in a second possible implementation manner, if the second decoding processing is the second receive diversity processing, the second decoding unit is specifically configured to perform second receive diversity decoding processing on the second data to generate the second mapping data at the second data layers, where each of the second data layers includes same data.

With reference to the second possible implementation manner of the fourth aspect, in a third possible implementation manner, the second decoding unit is specifically configured to perform, by using a second diversity precoding matrix with p rows and v columns, the second receive diversity decoding processing on the second data to generate the second mapping data at the second data layers, where p is the quantity of antennas in the second antenna direction, v is the quantity of the second data layers, and v is not greater than p.

With reference to the first possible implementation manner of the fourth aspect, in a fourth possible implementation manner, if the second decoding processing is the second receive spatial multiplexing processing, the second decoding unit is specifically configured to perform second receive spatial multiplexing decoding processing on the second data to generate the second mapping data at the second data layers, where each of the second data layers includes different data; and the second mapping unit is specifically configured to perform the inverse mapping operation on the second mapping data according to the quantity of the second data layers to generate u pieces of second subdata, where a quantity u of the pieces of the second subdata is not greater than the quantity of the second data layers; and combine the u pieces of second subdata into the first data.

With reference to the fourth possible implementation manner of the fourth aspect, in a fifth possible implementation manner, the second decoding unit is specifically configured to perform, by using a second multiplexing precoding matrix with p rows and v columns, the second receive spatial multiplexing decoding processing on the second data to generate the second mapping data at the second data layers, where p is the quantity of antennas in the second antenna direction, v is the quantity of the second data layers, and v is not greater than p.

With reference to any possible implementation manner of the fourth aspect to the fifth possible implementation manner of the fourth aspect, in a sixth possible implementation manner, the first processing module includes: a first decoding unit and a first mapping unit; where if the first decoding processing is the first receive diversity processing, the first decoding unit is configured to perform, by using a first diversity precoding matrix, first receive diversity decoding processing on the first data to generate the first mapping data; and the first mapping unit is configured to perform an inverse mapping operation on the first mapping data to generate the to-be-sent data; or if the first decoding processing is the first receive spatial multiplexing processing, the first decoding unit is configured to perform, by using a first multiplexing precoding matrix, first receive spatial multiplexing decoding processing on the first data to generate the first mapping data; and the first mapping unit is configured to perform an inverse mapping operation on the first mapping data according to a quantity of the first data layers to generate w pieces of first subdata, where a quantity w of the pieces of the first subdata is not greater than the quantity of the first data layers, and combine the w pieces of first subdata into the to-be-sent data.

With reference to any possible implementation manner of the fourth aspect to the sixth possible implementation manner of the fourth aspect, in a seventh possible implementation manner, the receive node further includes that:

the first antenna direction and the second antenna direction are spatially orthogonal to each other; or the first antenna direction and the second antenna direction are cross polarized at 45 degrees; or the first antenna direction and the second antenna direction are vertically polarized.

With reference to any possible implementation manner of the fourth aspect to the seventh possible implementation manner of the fourth aspect, in an eighth possible implementation manner, the receive node further includes:

a signaling receiving module, configured to receive the quantity of the first data layers and the quantity of the second data layers that are sent by the transmit node by using signaling.

With reference to any possible implementation manner of the fourth aspect to the eighth possible implementation manner of the fourth aspect, in a ninth possible implementation manner, the receive node further includes:

a reference signal module, configured to receive a precoded reference signal sent by the transmit node, where the reference signal is generated by the transmit node after the transmit node performs the first precoding processing on a reference signal in the first antenna direction and performs the second precoding processing on the reference signal in the second antenna direction.

With reference to the ninth possible implementation manner of the fourth aspect, in a tenth possible implementation manner, the reference signal is at least one of a CRS, a CSI-RS, and a DM-RS.

According to the data transmission method for a multi-antenna system, and the devices that are provided in the embodiments of the present invention, first precoding processing is performed on to-be-sent data in a first antenna direction of a multi-antenna system to generate first data, and second precoding processing is performed on the first data in a second antenna direction of the multi-antenna system to generate second data, which achieves an objective of sending the to-be-sent data in two-dimensional array antenna directions of the multi-antenna system.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
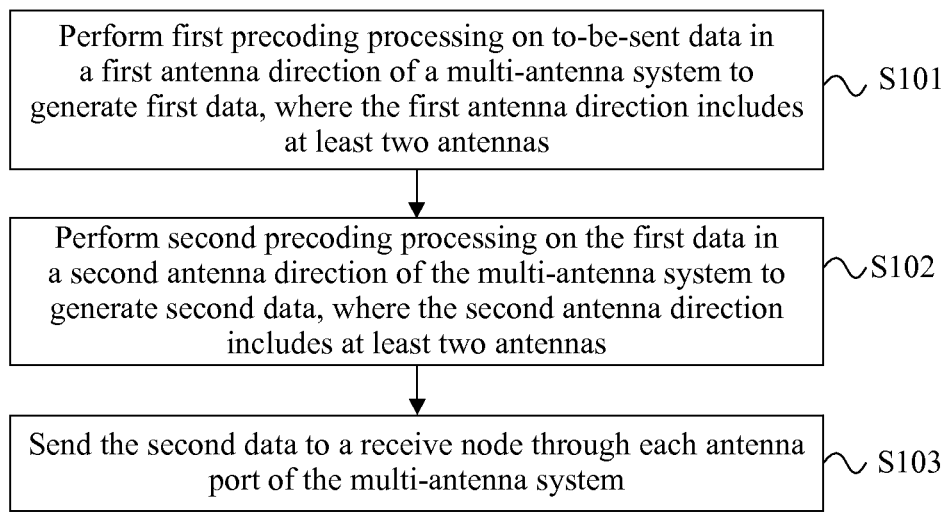
FIG. 1 is a flowchart of Embodiment 1 of a data transmission method for a multi-antenna system according to an embodiment of the present invention.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In a current Long Term Evolution (LTE) system, a one-dimensional 2-antenna or 4-antenna diversity data sending scheme is available. When multiple antennas are used to send data, a quantity of layers of data that can be sent is not greater than a quantity of the antennas. Therefore, to-be-sent data first needs to be mapped into corresponding data layers. For example, when two antennas are used, because a maximum of two layers of data can be sent, the to-be-sent data can be mapped into a maximum of two data layers; when four antennas are used, because a maximum of four layers of data can be sent, the to-be-sent data can be mapped into a maximum of four data layers. Table 1 lists a scheme of mapping codewords to layers that is used in an existing two-antenna or four-antenna transmit diversity.

TABLE 1

Scheme of mapping codewords to layers that is used in an existing two-antenna or four-antenna transmit diversity

| Quantity of layers | Quantity of codewords | Mapping codewords to layers $i = 0, 1, \ldots, M_{symb}^{layer} - 1$ | |
|---|---|---|---|
| 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |
| 4 | 1 | $x^{(0)}(i) = d^{(0)}(4i)$ $x^{(1)}(i) = d^{(0)}(4i+1)$ $x^{(2)}(i) = d^{(0)}(4i+2)$ $x^{(3)}(i) = d^{(0)}(4i+3)$ | $M_{symb}^{layer} = \begin{cases} M_{symb}^{(0)}/4 & \text{if } M_{symb}^{(0)} \bmod 4 = 0 \\ (M_{symb}^{(0)} + 2)/4 & \text{if } M_{symb}^{(0)} \bmod 4 \neq 0 \end{cases}$ If $M_{symb}^{(0)} \bmod 4 \neq 0$, two empty symbols are added behind $d^{(0)}(M_{symb}^{(0)} - 1)$. |

As shown in Table 1, when a diversity scheme is used to send data, because a quantity of used codewords is always 1, one codeword is used. This means that all data symbols (symb) are obtained by performing constellation modulation on one codeword code block. When two antennas are used, a maximum of two layers of data can be sent. Therefore, $M_{symb}^{layer} = M_{symb}^{(0)}/2$ indicates that to-be-sent data is divided into two pieces, which are corresponding to two data layers, where $M_{symb}^{(0)}$ is a quantity of symbols in the to-be-sent data, $M_{symb}^{layer}$ is a quantity of data symbols that are allocated to each layer, and layer indicates a quantity of layers. $x^{(v)}(i)$ indicates the $i^{th}$ data symbol at the $v^{th}$ data layer after mapping is performed, and $d^{(0)}(2i)$ and $d^{(0)}(2i+1)$ respectively indicate data at an even digit and data at an odd digit of to-be-mapped data. In this way, the to-be-sent data is mapped into two data layers. When four antennas are used, a maximum of four layers of data can be sent, and to-be-sent data is mapped into four layers. Therefore, $$M_{symb}^{layer} = \begin{cases} M_{symb}^{(0)}/4 & \text{if } M_{symb}^{(0)} \bmod 4 = 0 \\ (M_{symb}^{(0)} + 2)/4 & \text{if } M_{symb}^{(0)} \bmod 4 \neq 0 \end{cases}$$

indicates that the to-be-sent data is divided into four pieces, which are corresponding to four data layers. If $M_{symb}^{(0)}$ can be exactly divided by 4, $M_{symb}^{(0)}$ is divided into four data layers; if $M_{symb}^{(0)}$ cannot be exactly divided by 4, two empty symbols are added, and the empty symbols are added behind $d^{(0)}(M_{symb}^{(0)}-1)$, and then all data symbols are divided into four data layers. $d^{(0)}(4i)$, $d^{(0)}(4i+1)$, $d^{(0)}(4i+2)$, and $d^{(0)}(4i+3)$ indicate data of the to-be-sent data allocated to four data layers after mapping is performed. In this way, the to-be-sent data is mapped into four data layers.

After the to-be-sent data is mapped into layers, precoding processing needs to be performed on data at the layers, and the data at the layers needs to be mapped into corresponding antenna ports, so that the data can be sent by using antennas. For a two-antenna diversity, the following formula is used for mapping:

$$\begin{bmatrix} y^{(0)}(2i) \\ y^{(1)}(2i) \\ y^{(0)}(2i+1) \\ y^{(1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \text{Re}(x^{(0)}(i)) \\ \text{Re}(x^{(1)}(i)) \\ \text{Im}(x^{(0)}(i)) \\ \text{Im}(x^{(1)}(i)) \end{bmatrix}$$

where $$\frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix}$$

is a precoding matrix, $y^{(P)}(i)$ indicates data is a precoding matrix, $y^{(P)}(i)$ indicates data on a time-frequency resource i, P indicates the $P^{th}$ antenna, $x^{(v)}(i)$ indicates the $i^{th}$ data symbol at the $v^{th}$ layer, Re indicates obtaining a real part of a complex number, and Im indicates obtaining an imaginary part of a complex number. In this way, data at layers is mapped into different frequency domain resources of antennas, so that data at different layers can be sent by using different time-frequency resources of different antennas, which achieves an objective of sending data by using a diversity.

For a four-antenna diversity, the following formula is used for mapping:

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} Re(x^{(0)}(i)) \\ Re(x^{(1)}(i)) \\ Re(x^{(2)}(i)) \\ Re(x^{(3)}(i)) \\ Im(x^{(0)}(i)) \\ Im(x^{(1)}(i)) \\ Im(x^{(2)}(i)) \\ Im(x^{(3)}(i)) \end{bmatrix}$$

where $$\frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix}$$

is a precoding matrix; $y^{(P)}(i)$ indicates data on a time-frequency resource i, P indicates the $P^{th}$ antenna, $x^{(v)}(i)$ indicates the $i^{th}$ data symbol at the with layer, Re indicates obtaining a real part of a complex number, and Im indicates obtaining an imaginary part of a complex number. In this way, data at layers is mapped into different time-frequency resources of antennas, so that data at different layers can be sent by using different frequency domain resources of different antennas, which achieves an objective of sending data by using a diversity.

FIG. 1 is a flowchart of Embodiment 1 of a data transmission method for a multi-antenna system according to an embodiment of the present invention. As shown in FIG. 1, the method in this embodiment includes:

Step S101: Perform first precoding processing on to-be-sent data in a first antenna direction of a multi-antenna system to generate first data, where the first antenna direction includes at least two antennas.

Specifically, the multi-antenna system in this embodiment includes two antenna directions in total, and is a two-dimensional multi-antenna system; for example, the multi-antenna system may be a two-dimensional planar array antenna. The first precoding processing is first performed on the to-be-sent data in multiple antennas in the first antenna direction, where the first precoding processing may be first transmit diversity processing or first transmit spatial multiplexing processing. For a specific method for transmit diversity processing, reference may be made to the one-dimensional 2-antenna or 4-antenna diversity data sending scheme in the foregoing LTE system. However, this embodiment is not limited to two antennas or four antennas. A specific method for first transmit spatial multiplexing processing is similar to a method for first transmit diversity processing, and the only difference lies in that the first spatial multiplexing processing can be performed by using multiple codewords, and each data layer may be corresponding to different codewords. That is, the first transmit diversity processing is to send one piece of data by using multiple antennas, whereas the first transmit spatial multiplexing processing is to send multiple pieces of data by using multiple antennas. In a word, the to-be-sent data needs to be mapped into multiple data layers, and then precoding processing is performed on the data at the multiple data layers to generate the first data in the first antenna direction. The first antenna direction of the multi-antenna system may include multiple antennas, which are corresponding to multiple data layers in the first antenna direction. In this embodiment, the to-be-sent data may be mapped into only some of the data layers corresponding to the first antenna direction; not all of the data layers corresponding to the first antenna direction need to be used, that is, some of the antennas corresponding to the first antenna direction are used.

Step S102: Perform second precoding processing on the first data in a second antenna direction of the multi-antenna system to generate second data, where the second antenna direction includes at least two antennas.

Specifically, the multi-antenna system further includes the second antenna direction; after the first data is generated by processing the to-be-sent data in the first antenna direction, the second precoding processing is performed on the first data to generate the second data, where the generated second data is corresponding to two antenna directions of the multi-antenna system. A process of performing the second precoding processing on the first data also includes first mapping the first data to data at second data layers corresponding to the second antenna direction, and then mapping the data at the second data layers into each antenna port in the second antenna direction by using a precoding matrix. In this embodiment, the first data may be mapped into only some of the data layers corresponding to the second antenna direction; not all of the data layers corresponding to the second antenna direction need to be used, that is, some of antennas corresponding to the second antenna direction are used. When the first precoding processing performed in the first antenna direction is the first transmit diversity processing, the second precoding processing performed in the second antenna direction is second transmit diversity processing or second transmit spatial multiplexing processing; when the first precoding processing performed in the first antenna direction is the first transmit spatial multiplexing processing, the second precoding processing performed in the second antenna direction is second transmit diversity processing. A method for performing the second transmit diversity processing or the second transmit spatial multiplexing processing in the second antenna direction is similar to a method for performing the first transmit diversity processing or the first spatial multiplexing processing in the first antenna direction, and the two methods only slightly differ in used precoding matrices and data layer mapping methods.

Step S103: Send the second data to a receive node through each antenna port of the multi-antenna system.

Specifically, after the to-be-sent data is processed in the two antenna directions of the multi-antenna system, the second data corresponding to the two antenna directions of the multi-antenna system is generated; because mapping processing is performed on the to-be-sent data in both the two antenna directions, the second data is separately corresponding to the two antenna directions of the multi-antenna system. Therefore, the second data may be sent to the receive node through each antenna port in the two antenna directions of the multi-antenna system, thereby achieving an objective of sending the to-be-sent data in the two antenna directions of the multi-antenna system.

In this embodiment, first precoding processing is performed on to-be-sent data in a first antenna direction of a multi-antenna system to generate first data, and second precoding processing is performed on the first data in a second antenna direction of the multi-antenna system to generate second data, which achieves an objective of sending the to-be-sent data in two-dimensional array antenna directions of the multi-antenna system.

Figure 2:
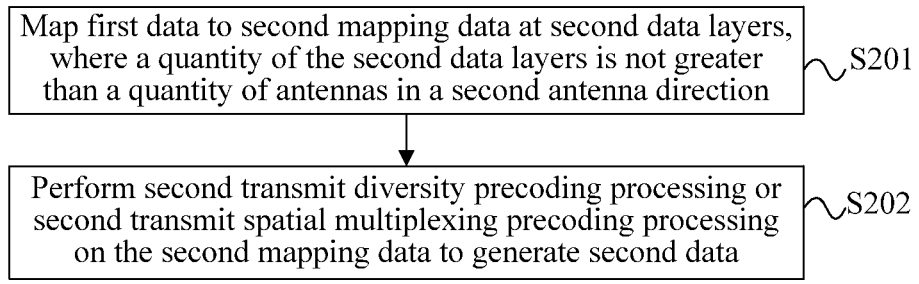
FIG. 2 is a flowchart of Embodiment 2 of a data transmission method for a multi-antenna system according to an embodiment of the present invention.

FIG. 2 is a flowchart of Embodiment 2 of a data transmission method for a multi-antenna system according to an embodiment of the present invention. This embodiment is used to specifically implement an operation of performing second precoding processing on first data in a second antenna direction to generate second data. As shown in FIG. 2, the method in this embodiment includes:

Step S201: Map first data to second mapping data at second data layers, where a quantity of the second data layers is not greater than a quantity of antennas in a second antenna direction.

Specifically, after the first data is generated by processing to-be-sent data in a first antenna direction, the first data is mapped to the second mapping data at the second data layers, where the second data layers are corresponding to the second antenna direction; because each antenna can be used to send a maximum of one layer of data, the quantity of the second data layers cannot be greater than the quantity of antennas in the second antenna direction.

In a two-dimensional multi-antenna system, each antenna in the first antenna direction is corresponding to multiple antennas in the second antenna direction, and therefore the first data that is generated after first precoding processing is performed on the to-be-sent data in the first antenna direction may be processed according to a second transmit diversity scheme in the second antenna direction, or may be processed according to a second transmit spatial multiplexing scheme. The second transmit diversity scheme in the second antenna direction is similar to first transmit diversity processing in the first antenna direction. That is, a piece of the first data that is corresponding to each antenna in the first antenna direction is converted into data in the second antenna direction corresponding to the antenna, and data in each antenna in the second antenna direction corresponding to the antenna is the same. The second transmit spatial multiplexing scheme in the second antenna direction is as follows: First, the first data is divided into multiple pieces of first subdata, where a quantity of the multiple pieces of the first subdata is the quantity of the second data layers, and then each piece of data that is in the multiple pieces of the first subdata and corresponding to each antenna in the first antenna direction is converted into data in the second antenna direction corresponding to the antenna, and data in each antenna in the second antenna direction corresponding to the antenna is different. That is, when the second transmit diversity scheme is used to perform processing in the second antenna direction, the data in each antenna in the second antenna direction corresponding to the first antenna direction is the same; when the second transmit spatial multiplexing scheme is used to perform processing in the second antenna direction, the data in each antenna in the second antenna direction corresponding to the first antenna direction is different.

The following separately describes methods for performing processing by using the second transmit diversity scheme and the second transmit spatial multiplexing scheme in the second antenna direction.

In case one, the second transmit diversity scheme is used in the second antenna direction, and the first data is mapped to the second mapping data at the second data layers, where all of the second data layers include same data. Table 2 shows a scheme of mapping codewords to layers by using the second transmit diversity scheme in the second antenna direction.

TABLE 2

Scheme of mapping codewords to layers by using the second transmit diversity scheme in the second antenna direction

| Quantity of layers | Quantity of codewords | Mapping codewords to layers $i = 0, 1, \ldots, M_{symb}^{layer} - 1$ | |
|---|---|---|---|
| $M_p$ | 1 | $x^{(v,n_p)}(i) = y^{(n_p)}(i), 1 \leq v \leq M_p$ | $M_{symb}^{layer} = M_{symb}^{(0)}$ |
| 2 | 1 | $x^{(0,n_p)}(i) = y^{(n_p)}(i)$ $x^{(1,n_p)}(i) = y^{(n_p)}(i)$ | $M_{symb}^{layer} = M_{symb}^{(0)}$ |
| 4 | 1 | $x^{(0,n_p)}(i) = y^{(n_p)}(i)$ $x^{(1,n_p)}(i) = y^{(n_p)}(i)$ $x^{(2,n_p)}(i) = y^{(n_p)}(i)$ $x^{(3,n_p)}(i) = y^{(n_p)}(i)$ | $M_{symb}^{layer} = M_{symb}^{(0)}$ |

As shown in Table 2, when the second diversity scheme is used to perform data mapping in the second antenna direction, data sent by each antenna that is in the second antenna direction and corresponding to an antenna in the first antenna direction is the same, and a quantity of used codewords is 1. $M_{symb}^{layer} = M_{symb}^{(0)}$ indicates that a quantity of symbols in to-be-sent data at each layer is the same, where $M_{symb}^{(0)}$ is a quantity of symbols used by the first data and is also equal to a quantity of symbols, to which the first data is mapped, on each antenna port in the first antenna direction, $M_{symb}^{layer}$ is a quantity of data symbols allocated to each of the second data layers, and layer indicates the quantity of the second data layers. $x^{(v,n_p)}(i)$ indicates the $i^{th}$ data symbol at a second data layer v corresponding to the $(n_p)$th antenna port in the first antenna direction, $y^{(n_p)}(i)$ indicates data that is corresponding to the first data and on the $(n_p)$th antenna port in the first antenna direction, and $M_p$ is a maximum quantity of the second data layers. For example, when the maximum quantity of the second data layers is 2, that is, the second antenna direction includes only two antennas, the first data can be mapped to data at a maximum of two second data layers, and data at different second data layers corresponding to each antenna port in the first antenna direction is the same. When the maximum quantity of the second data layers is 4, that is, the second antenna direction includes four antennas, the first data can be mapped to data at a maximum of four second data layers, and data at different second data layers corresponding to each antenna port in the first antenna direction is the same.

In case two, the second transmit spatial multiplexing scheme is used in the second antenna direction. First, the first data is divided into u pieces of first subdata, where a quantity u of the pieces of the first subdata is not greater to the quantity of the second data layers, and then the u pieces of first subdata are mapped to the second mapping data at the second data layers, and each piece of the first subdata is mapped into one second data layer. Table 3 shows a scheme of mapping codewords to layers by using the second transmit spatial multiplexing scheme in the second antenna direction. Table 3 Scheme of mapping codewords to layers by using the second transmit spatial multiplexing scheme in the second antenna direction.

TABLE 3

Scheme of mapping codewords to layers by using the second transmit spatial multiplexing scheme in the second antenna direction

| Quantity of layers | Quantity of codewords | Mapping codewords to layers $i = 0, 1, \ldots, M_{symb}^{layer} - 1$ | |
|---|---|---|---|
| 2 | 1 | $x^{(0,n_p)}(i) = y^{(0)(n_p)}(2i)$ $x^{(1,n_p)}(i) = y^{(0)(n_p)}(2i+1)$ | $M_{symb}^{layer} = M_{symb}^{(0)}/2$ |
| 2 | 2 | $x^{(0,n_p)}(i) = y^{(0)(n_p)}(i)$ $x^{(1,n_p)}(i) = y^{(1)(n_p)}(i)$ | $M_{symb}^{layer} = M_{symb}^{(0)} = M_{symb}^{(1)}$ |
| 3 | 1 | $x^{(0,n_p)}(i) = y^{(0)(n_p)}(3i)$ $x^{(1,n_p)}(i) = y^{(0)(n_p)}(3i+1)$ $x^{(2,n_p)}(i) = y^{(0)(n_p)}(3i+2)$ | $M_{symb}^{layer} = M_{symb}^{(0)}/3$ |
| 3 | 2 | $x^{(0,n_p)}(i) = y^{(0)(n_p)}(i)$ $x^{(1,n_p)}(i) = y^{(1)(n_p)}(2i)$ $x^{(2,n_p)}(i) = y^{(1)(n_p)}(2i+1)$ | $M_{symb}^{layer} = M_{symb}^{(0)} = M_{symb}^{(1)}/2$ |
| 4 | 1 | $x^{(0,n_p)}(i) = y^{(0)(n_p)}(4i)$ $x^{(1,n_p)}(i) = y^{(0)(n_p)}(4i+1)$ $x^{(2,n_p)}(i) = y^{(0)(n_p)}(4i+2)$ $x^{(3,n_p)}(i) = y^{(0)(n_p)}(4i+3)$ | $M_{symb}^{layer} = M_{symb}^{(0)}/4$ |
| 4 | 2 | $x^{(0,n_p)}(i) = y^{(0)(n_p)}(2i)$ $x^{(1,n_p)}(i) = y^{(0)(n_p)}(2i+1)$ $x^{(2,n_p)}(i) = y^{(1)(n_p)}(2i)$ $x^{(3,n_p)}(i) = y^{(1)(n_p)}(2i+1)$ | $M_{symb}^{layer} = M_{symb}^{(0)}/2 = M_{symb}^{(1)}/2$ |
| 5 | 2 | $x^{(0,n_p)}(i) = y^{(0)(n_p)}(2i)$ $x^{(1,n_p)}(i) = y^{(0)(n_p)}(2i+1)$ $x^{(2,n_p)}(i) = y^{(1)(n_p)}(3i)$ $x^{(3,n_p)}(i) = y^{(1)(n_p)}(3i+1)$ $x^{(4,n_p)}(i) = y^{(1)(n_p)}(3i+2)$ | $M_{symb}^{layer} = M_{symb}^{(0)}/2 = M_{symb}^{(1)}/3$ |
| 6 | 2 | $x^{(0,n_p)}(i) = y^{(0)(n_p)}(3i)$ $x^{(1,n_p)}(i) = y^{(0)(n_p)}(3i+1)$ $x^{(2,n_p)}(i) = y^{(0)(n_p)}(3i+2)$ $x^{(3,n_p)}(i) = y^{(1)(n_p)}(3i)$ $x^{(4,n_p)}(i) = y^{(1)(n_p)}(3i+1)$ $x^{(5,n_p)}(i) = y^{(1)(n_p)}(3i+2)$ | $M_{symb}^{layer} = M_{symb}^{(0)}/3 = M_{symb}^{(1)}/3$ |
| 7 | 2 | $x^{(0,n_p)}(i) = y^{(0)(n_p)}(3i)$ $x^{(1,n_p)}(i) = y^{(0)(n_p)}(3i+1)$ $x^{(2,n_p)}(i) = y^{(0)(n_p)}(3i+2)$ $x^{(3,n_p)}(i) = y^{(1)(n_p)}(4i)$ $x^{(4,n_p)}(i) = y^{(1)(n_p)}(4i+1)$ $x^{(5,n_p)}(i) = y^{(1)(n_p)}(4i+2)$ $x^{(6,n_p)}(i) = y^{(1)(n_p)}(4i+3)$ | $M_{symb}^{layer} = M_{symb}^{(0)}/3 = M_{symb}^{(1)}/4$ |
| 8 | 2 | $x^{(0,n_p)}(i) = y^{(0)(n_p)}(4i)$ $x^{(1,n_p)}(i) = y^{(0)(n_p)}(4i+1)$ $x^{(2,n_p)}(i) = y^{(0)(n_p)}(4i+2)$ $x^{(3,n_p)}(i) = y^{(0)(n_p)}(4i+3)$ $x^{(4,n_p)}(i) = y^{(1)(n_p)}(4i)$ $x^{(5,n_p)}(i) = y^{(1)(n_p)}(4i+1)$ $x^{(6,n_p)}(i) = y^{(1)(n_p)}(4i+2)$ $x^{(7,n_p)}(i) = y^{(1)(n_p)}(4i+3)$ | $M_{symb}^{layer} = M_{symb}^{(0)}/4 = M_{symb}^{(1)}/4$ |

Table 3 shows only a part of the scheme of mapping the first data to the second mapping data in the second antenna direction by using the second transmit spatial multiplexing scheme, and a mapping scheme in which another quantity of layers and another quantity of codewords are used can be obtained according to a method similar to that in Table 3. As shown in Table 3, when the second transmit spatial multiplexing scheme is used in the second antenna direction to perform data mapping, the first data first needs to be divided into v pieces, where v is the quantity of the second data layers. Because a maximum of one layer of data can be sent by each antenna, the quantity of the second data layers is not greater than the quantity of antennas in the second antenna direction, and one or more codewords may be used in the second antenna direction to perform data mapping. For example, when the quantity of the second data layers is 2, one or two codewords may be used to map the first data into the second data layers. When one codeword is used, $M_{symb}^{layer} = M_{symb}^{(0)}/2$ indicates using a quantity of symbols on a codeword whose number is 0 to divide the first data into two pieces, which are corresponding to data at two second data layers; $M_{symb}^{layer} = M_{symb}^{(0)}/2$ indicates using a quantity of symbols on a codeword whose number is 0 and a quantity of symbols on a codeword whose number is 1 to divide the first data into two pieces, where $M_{symb}^{(0)}$ is the quantity of symbols on the codeword whose number is 0, $M_{symb}^{(1)}$ is the quantity of symbols on the codeword whose number is 1, $M_{symb}^{layer}$ is a quantity of data symbols that are allocated to each layer, and layer indicates a quantity of layers. When one codeword is used, $x^{(0,n_p)}(i) = y^{(0)(n_p)}(2i)$ and $x^{(1,n_p)}(i) = y^{(0)(n_p)}(2i+1)$ indicate mapping the first data to the second mapping data at the second data layers, where $x^{(0,n_p)}(i)$ indicates the $i^{th}$ data symbol that is at the 0th layer in the second antenna direction and corresponding to the $(n_p)$th antenna port in the first antenna direction, $x^{(1,n_p)}(i)$ indicates the $i^{th}$ data symbol that is at the first layer in the second antenna direction and corresponding to the $(n_p)$th antenna port in the first antenna direction, and $y^{(0)(n_p)}(2i)$ and $y^{(0)(n_p)}(2i+1)$ indicate data of the first data that is allocated, after codeword mapping is performed, to two data layers by using a codeword whose number is 0. When two codewords are used, $x^{(0,n_p)}(i) = y^{(0)(n_p)}(i)$ and $x^{(1,n_p)}(i) = y^{(1)(n_p)}(i)$ indicate mapping the first data to the second mapping data at the second data layers, where $x^{(0,n_p)}(i)$ indicates the $i^{th}$ data symbol that is at the 0th layer in the second antenna direction and corresponding to the $(n_p)$th antenna port in the first antenna direction, $x^{(1,n_p)}(i)$ indicates the $i^{th}$ data symbol that is at the first layer in the second antenna direction and corresponding to the $(n_p)$th antenna port in the first antenna direction, $y^{(0)(n_p)}(i)$ and $y^{(1)(n_p)}(i)$ indicate data of the first data that is allocated, after codeword mapping is performed, to two data layers by using a codeword whose number is 0 and a codeword whose number is 1. For another example, when the quantity of the second data layers is 6, two codewords may be used to map the first data into the second data layers. $M_{symb}^{layer} = M_{symb}^{(0)}/3 = M_{symb}^{(1)}/3$ indicates using a codeword whose number is 0 and a codeword whose number is 1 to divide the first data into six pieces, that is, using the codeword whose number is 0 to divide the first data into three pieces and using the codeword whose number is 1 to divide the first data into three pieces, where $M_{symb}^{(0)}$ is a quantity of symbols on the codeword whose number is 0, $M_{symb}^{(1)}$ is a quantity of symbols on the codeword whose number is 1, $M_{symb}^{layer}$ is a quantity of data symbols that are allocated to each layer, and layer indicates a) quantity of layers. When two codewords are used, $x^{(0,n_p)}(i) = y^{(0)(n_p)}(3i)$, $x^{(1,n_p)}(i) = y^{(0)(n_p)}(3i+1)$, $x^{(2,n_p)}(i) = y^{(0)(n_p)}(3i+2)$, $x^{(3,n_p)}(i) = y^{(1)(n_p)}(3i)$, $x^{(4,n_p)}(i) = y^{(1)(n_p)}(3i+1)$, and $x^{(5,n_p)}(i) = y^{(1)(n_p)}(3i+2)$ indicate mapping the first data to the second mapping data at the second data layers, where $x^{(0,n_p)}(i)$ indicates the $i^{th}$ data symbol that is at the 0th layer in the second antenna direction and corresponding to the $(n_p)$th antenna port in the first antenna direction, $x^{(1,n_p)}(i)$ indicates the $i^{th}$ data symbol that is at the first layer in the second antenna direction and corresponding to the $(n_p)$th antenna port in the first antenna direction, and by analogy, $x^{(5,n_p)}(i)$ indicates data that is at the fifth layer in the second antenna direction and corresponding to the $(n_p)$th antenna port in the first antenna direction. $y^{(0)(n_p)}(3i)$, $y^{(0)(n_p)}(3i+1)$, and $y^{(0)(n_p)}(3i+2)$ indicate data of the first data that is allocated, after codeword mapping is performed, to three data layers by using a codeword whose number is 0, $y^{(1)(n_p)}(3i)$, $y^{(1)(n_p)}(3i+1)$, and $y^{(1)(n_p)}(3i+2)$ indicate data of the first data that is allocated, after codeword mapping is performed, to three data layers by using a codeword whose number is 1. Therefore, the first data is allocated as data at six data layers by using the codeword whose number is 0 and the codeword whose number is 1.

Step S202: Perform second transmit diversity precoding processing or second transmit spatial multiplexing precoding processing on the second mapping data to generate second data.

Specifically, after a data mapping operation is performed on the first data at the second data layers corresponding to the second antenna direction, the second transmit diversity precoding processing or the second transmit spatial multiplexing precoding processing is performed on the generated second mapping data to generate the second data that is finally sent by the multi-antenna system. When a second transmit diversity scheme is used in the second antenna direction to map data into layers, the second transmit diversity precoding processing is used; when a second transmit spatial multiplexing scheme is used in the second antenna direction to map data into layers, the second transmit diversity precoding processing is used.

When the second transmit diversity scheme is used in the second antenna direction, $y^{(u,n_p)}(i)=Wx^{(v,n_p)}(i)$ is used to perform a second transmit diversity precoding operation, where W is a second diversity precoding matrix with $M_p$ rows and v columns, and $y^{(u,n_p)}(i)$ is data obtained after the second precoding processing is performed on all $M_p$ antennas that are in the second antenna direction and corresponding to the $(n_p)$th antenna in the first antenna direction. After the foregoing processing is performed, data in the second antenna direction can simultaneously point to a spatial direction in which v second antennas are located, and data in v beams in the second antenna direction can be converted onto Mp antenna ports.

When the second transmit spatial multiplexing scheme is used in the second antenna direction, a second multiplexing precoding matrix with $M_p$ rows and v columns is used to perform an operation similar to that in the second transmit diversity scheme.

Figures 3, 4A:
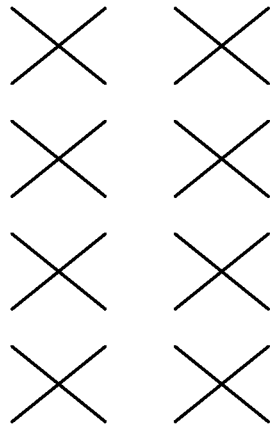
FIG. 3 is a specific embodiment of layer mapping and codeword mapping in a multi-antenna system.
FIG. 4A is a schematic diagram of a multi-antenna system in a 45-degree cross polarization manner.

The following provides description with reference to FIG. 3. FIG. 3 is a specific embodiment of layer mapping and codeword mapping in a multi-antenna system. As shown in FIG. 3, a multi-antenna system with an array of 4 rows and 4 columns that are vertically polarized is provided, where a horizontal direction is a first antenna direction, and a vertical direction is a second antenna direction. In FIG. 3, second transmit diversity processing is performed in the second antenna direction. On the $i^{th}$ frequency domain resource, after first precoding processing is performed in the first antenna direction, obtained data on four antenna ports is $y^{(0)}(i)$, $y^{(1)}(i)$, $y^{(2)}(i)$, $y^{(3)}(i)$. Then the second transmit diversity processing is performed in the second antenna direction. Data on the first antenna in the first antenna direction is $y^{(0)}(i)$, and $y^{(0)}(i)$, needs to be extended to all antennas that are in the second antenna direction and corresponding to the first antenna in the first antenna direction. A method for performing a layer mapping operation is as follows: If there are v layers, v copies of $y^{(0)}(i)$ are made. If there are three layers, $x^{(v,n_p)}(i)$ may be calculated according to a method in Table 2, and $x^{(0,0)}(i)=y^{(0)}(i)$, $x^{(1,0)}(i)=y^{(0)}(i)$, and $x^{(2,0)}(i)=y^{(0)}(i)$ are obtained separately. According to $y^{(u,n_p)}(i)=Wx^{(v,n_p)}(i)$, a precoding matrix W with 4 rows and 3 columns is selected for performing calculation.

That is:

$$\begin{bmatrix} y^{(0,0)}(4i) \\ y^{(1,0)}(4i) \\ y^{(2,0)}(4i) \\ y^{(3,0)}(4i) \end{bmatrix} = \begin{bmatrix} w_0 & w_1 & w_2 \end{bmatrix} \begin{bmatrix} x^{(0,0)}(i) \\ x^{(1,0)}(i) \\ x^{(2,0)}(i) \end{bmatrix}$$

where $w_0$, $w_1$, and $w_2$ are three column vectors that is of 4 rows and 1 column and has a length of 4. The precoding matrix W may be a precoding matrix defined in an existing protocol, or may be a user-defined precoding matrix This embodiment provides a specific scheme for performing mapping in the second antenna direction, where a second transmit diversity scheme or a second transmit spatial multiplexing scheme can be used. If the second transmit diversity scheme is used, a coverage area of a transmit node can be further extended, and a data transmission rate can be increased; if the second transmit spatial multiplexing scheme is used, more data can be transmitted by using a same time-frequency resource.

Figure 4B:
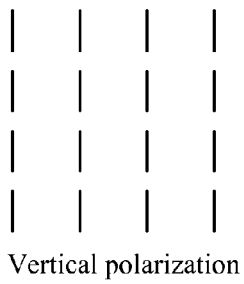
FIG. 4B is a schematic diagram of a multi-antenna system in a vertical polarization manner.

In the foregoing embodiments, the first antenna direction and the second antenna direction in the multi-antenna system may be spatially orthogonal to each other; or the first antenna direction and the second antenna direction may be cross polarized at 45 degrees; or the first antenna direction and the second antenna direction may be vertically polarized. FIG. 4A is a schematic diagram of a multi-antenna system in a 45-degree cross polarization manner; FIG. 4B is a schematic diagram of a multi-antenna system in a vertical polarization manner. The present invention is not limited thereto. For any two-dimensional multi-antenna system, the method provided in the present invention can be used for processing.

Further, a transmit node needs to send a quantity of first data layers and a quantity of second data layers to a receive node by using signaling, so that the receive node can receive second data that is sent by using a multi-antenna system, and correctly acquire to-be-sent data by performing precoding processing. In this way, the receive node may receive the second data through an antenna port in a corresponding first antenna direction and an antenna port in a corresponding second antenna direction, and may use a correct second precoding matrix to perform decoding processing on the received second data, so as to obtain data sent by the transmit node.

Further, currently, the receive node may demodulate data by using a cell-specific reference signal (CRS) that is not precoded, or by using a demodulation reference signal (DM-RS) precoded in a manner that is the same as a precoding manner of a data part. Therefore, to make the technology in the present invention backward compatible with an existing protocol when a CRS is used, layer mapping and precoding operations that are the same as those performed on data sent in the second antenna direction need to be performed on the CRS in the second antenna direction. That is, same layer mapping is performed, and a same precoding matrix is used for precoding. In this way, a precoding manner used to perform transmit diversity or multiplexing processing on data of a receive node at a particular position is the same as a precoding manner used to precode a CRS in the first antenna direction and the second antenna direction. Therefore, the receive node at the particular position is not affected when demodulation is performed in an original manner.

Similarly, when other reference signals such as a DM-RS and a channel state information reference signal (CSI-RS) are being sent, the precoding method used in a two-dimensional antenna in the present invention may also be used to implement sending of the reference signals in a two-dimensional antenna array.

Figure 5:
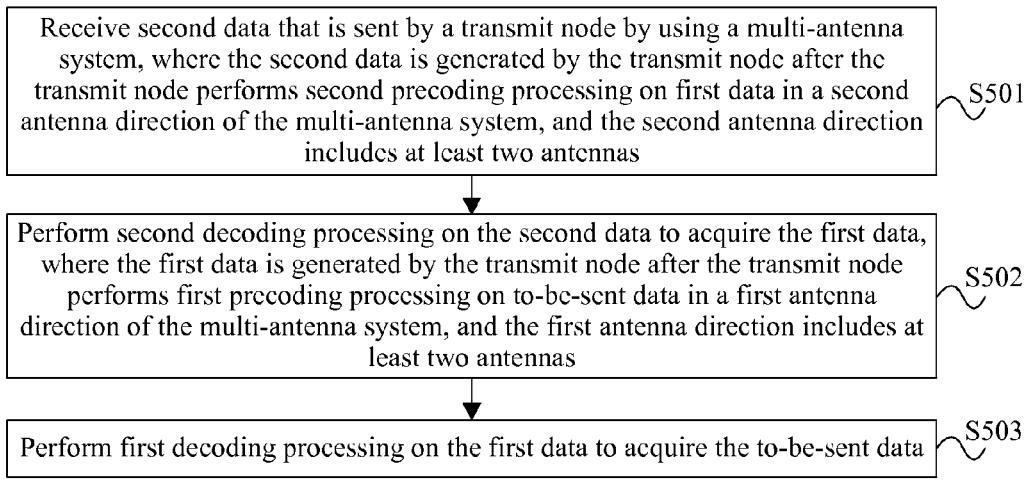
FIG. 5 is a flowchart of Embodiment 3 of a data transmission method for a multi-antenna system according to an embodiment of the present invention.

FIG. 5 is a flowchart of Embodiment 3 of a data transmission method for a multi-antenna system according to an embodiment of the present invention. As shown in FIG. 5, the method in this embodiment includes:

Step S501: Receive second data that is sent by a transmit node by using a multi-antenna system, where the second data is generated by the transmit node after the transmit node performs second precoding processing on first data in a second antenna direction of the multi-antenna system, and the second antenna direction includes at least two antennas.

Specifically, the multi-antenna system in this embodiment includes two antenna directions in total, and is a two-dimensional multi-antenna system; for example, the multi-antenna system may be a two-dimensional array antenna. A receive node receives the second data that is sent by the transmit node by using the multi-antenna system. Because the second data is generated by the transmit node after the transmit node performs the second precoding processing on the first data in the second antenna direction of the multi-antenna system, the second data and an antenna in the second antenna direction are corresponding to each other.

Step S502: Perform second decoding processing on the second data to acquire the first data, where the first data is generated by the transmit node after the transmit node performs first precoding processing on to-be-sent data in a first antenna direction of the multi-antenna system, and the first antenna direction includes at least two antennas.

Specifically, the receive node performs the second decoding processing on the received second data, so as to acquire the first data, where the first data is generated by the transmit node after the transmit node performs transmit diversity processing on the to-be-sent data in the first antenna direction of the multi-antenna system. A process in which the receive node performs the second decoding processing on the received second data is reverse to a process in which the transmit node performs precoding processing on the first data to generate the second data. However, as long as the receive node uses a mechanism and a parameter that are the same as those used by the transmit node, the receive node can perform a second decoding operation on the second data to generate the first data. The first data is corresponding to the first antenna direction. After the first data is acquired, it is equivalent to the fact that the receive node receives data that is sent by the transmit node by using a one-dimensional antenna, and therefore the receive node may perform subsequent processing according to an existing one-dimensional antenna receiving method.

Step S503: Perform first decoding processing on the first data to acquire the to-be-sent data.

Specifically, the receive node can obtain, by performing the first decoding processing on the first data, the to-be-sent data that needs to be sent by the transmit node. A method for performing the first decoding processing on the first data is similar to a one-dimensional antenna diversity receiving method in the prior art. When the first decoding processing is first receive diversity processing, the second decoding processing is second receive diversity processing or second receive spatial multiplexing processing; when the first decoding processing is first receive spatial multiplexing processing, the second decoding processing is second receive diversity processing.

In this embodiment, second data sent by a transmit node by using a multi-antenna system is received, second decoding processing is performed on the second data to generate first data, and first decoding processing is performed on the first data to obtain to-be-sent data that needs to be sent by the transmit node, which achieves an objective of receiving data in two antenna directions of the multi-antenna system.

Figure 6:
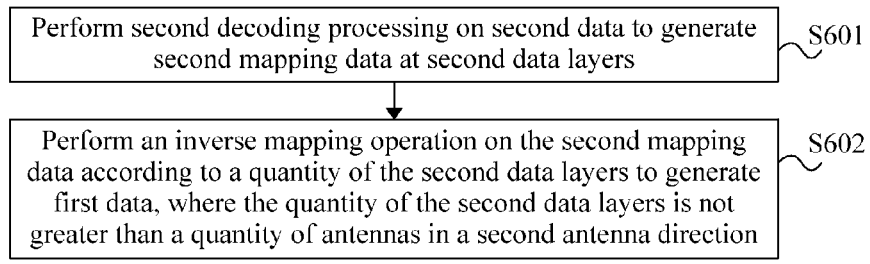
FIG. 6 is a flowchart of Embodiment 4 of a data transmission method for a multi-antenna system according to an embodiment of the present invention.

FIG. 6 is a flowchart of Embodiment 4 of a data transmission method for a multi-antenna system according to an embodiment of the present invention. This embodiment is used to specifically implement a process in which second decoding processing is performed on second data to obtain first data. As shown in FIG. 6, the method in this embodiment includes:

Step S601: Perform second decoding processing on second data to generate second mapping data at second data layers.

Specifically, a second antenna direction of a multi-antenna system includes at least two antennas; after receiving the second data, a receive node needs to convert the second data corresponding to the second antenna direction into first data corresponding to a first antenna direction, where the second data is generated after second precoding processing is performed on the first data. Therefore, the receive node needs to convert the second data into the first data corresponding to the first antenna direction by performing an operation that is reverse to precoding processing in a transmit node. The receive node first needs to perform the second decoding processing on the second data to generate the second mapping data at the second data layers, where the second data layers are corresponding to the second antenna direction. Because the transmit node may perform processing in the second antenna direction by using a second transmit diversity scheme, or by using a second transmit spatial multiplexing scheme, there are also two cases in which the receive node performs the second decoding processing on the second data, which are second receive diversity processing and second receive spatial multiplexing processing. There are also two cases for the obtained second mapping data: in case one, each of the second data layers includes same data; in case two, each of the second data layers includes different data.

When the second receive diversity scheme is used, a method for performing second receive diversity decoding processing is specifically as follows: The second receive diversity decoding processing is performed on the second data by using a second diversity precoding matrix with p rows and v columns, so as to generate the second mapping data at the second data layers, where p is a quantity of antennas in the second antenna direction, v is a quantity of the second data layers, and v is not greater than p.

When the second receive spatial multiplexing scheme is used, a method for performing second receive spatial multiplexing decoding processing is specifically as follows: The second receive spatial multiplexing processing is performed on the second data by using a second multiplexing precoding matrix with p rows and v columns, so as to generate the second mapping data at the second data layers, where p is a quantity of antennas in the second antenna direction, v is a quantity of the second data layers, and v is not greater than p.

Step S602: Perform an inverse mapping operation on the second mapping data according to a quantity of the second data layers, to generate first data, where the quantity of the second data layers is not greater than a quantity of antennas in a second antenna direction.

Specifically, the first data corresponding to the first antenna direction can be obtained by performing the inverse mapping operation on the second mapping data at the second data layers. In the two cases in step S601, if each of the second data layers includes same data, it indicates that the transmit node uses the second transmit diversity scheme in the second antenna direction. Therefore, the second mapping data at different second data layers corresponding to the same first antenna direction should be the same. In this case, the first data can be obtained by performing the inverse mapping operation on the second mapping data according to the quantity of the second data layers. Because each antenna can be used to send a maximum of one layer of data, the quantity of the second data layers is not greater than the quantity of antennas in the second antenna direction. The quantity of the second data layers may be preset in the receive node, or may be received by using another method.

If each of the second data layers includes different data, it indicates that the transmit node uses the second transmit spatial multiplexing scheme in the second antenna direction. In this case, the inverse mapping operation is first performed on the second mapping data according to the quantity of the second data layers to generate v pieces of first subdata, where a quantity v of the pieces of the first subdata is the quantity of the second data layers. Then, the v pieces of first subdata are combined into the first data. The second mapping data may be converted into the first data by performing an inverse operation of the scheme of mapping codewords to layers that is shown in Table 3.

In this embodiment, a specific scheme of performing inverse mapping in a second antenna direction is provided; for a second transmit diversity scheme or a second transmit spatial multiplexing scheme that is used by a transmit node, two methods are proposed, so that data transmitted by using different schemes can be received in a multi-antenna system.

In the embodiments described in FIG. 5 and FIG. 6, the first antenna direction and the second antenna direction in the multi-antenna system may be spatially orthogonal to each other; or the first antenna direction and the second antenna direction may be cross polarized at 45 degrees; or the first antenna direction and the second antenna direction may be vertically polarized. The present invention is not limited thereto. For any two-dimensional multi-antenna system, the method provided in the present invention can be used for processing.

Further, to receive the second data that is sent by the transmit node by using the multi-antenna system and correctly acquire to-be-sent data by performing decoding processing, the receive node needs to receive, by using signaling, a quantity of first data layers and the quantity of the second data layers that are sent by the transmit node. In this way, the receive node may receive the second data through an antenna port in the corresponding first antenna direction and an antenna port in the corresponding second antenna direction, and may use a correct second precoding matrix to perform decoding processing on the received second data, so as to obtain the data sent by the transmit node.

Further, currently, the receive node may demodulate data by using a CRS that is not precoded, or by using a DM-RS precoded in a manner that is the same as a precoding manner of a data part. Therefore, to make the technology in the present invention backward compatible with an existing protocol when a CRS is used, layer mapping and precoding operations that are the same as those performed on data sent in the second antenna direction need to be performed on the CRS in the second antenna direction. That is, same layer mapping is performed, and a same precoding matrix is used for precoding. In this way, a precoding manner used to perform transmit diversity or multiplexing processing on data of a receive node at a particular position is the same as a precoding manner used to precode a CRS in the first antenna direction and the second antenna direction. Therefore, the receive node at the particular position is not affected when demodulation is performed in an original manner.

Similarly, when other reference signals such as a DM-RS and a CSI-RS are being received, the precoding method used in a two-dimensional antenna in the present invention may also be used to implement receiving of the reference signals in a two-dimensional antenna array.

Figure 7:
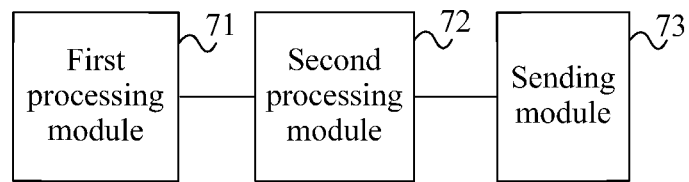
FIG. 7 is a schematic structural diagram of Embodiment 1 of a transmit node according to an embodiment of the present invention.

FIG. 7 is a schematic structural diagram of Embodiment 1 of a transmit node according to an embodiment of the present invention. As shown in FIG. 7, the transmit node in this embodiment includes:

a first processing module 71, configured to perform first precoding processing on to-be-sent data in a first antenna direction of a multi-antenna system to generate first data, where the first antenna direction includes at least two antennas;

a second processing module 72, configured to perform second precoding processing on the first data in a second antenna direction of the multi-antenna system to generate second data, where the second antenna direction includes at least two antennas; and a sending module 73, configured to send the second data through each antenna port of the multi-antenna system; where when the first precoding processing is first transmit diversity processing, the second precoding processing is second transmit diversity processing or second transmit spatial multiplexing processing; when the first precoding processing is first transmit spatial multiplexing processing, the second precoding processing is second transmit diversity processing.

The transmit node in this embodiment is used to implement the technical solution in Embodiment 1 of the data transmission method for a multi-antenna system shown in FIG. 1. An implementation principle and a technical effect of the transmit node are similar to those of the technical solution, and details are not described herein again.

Figure 8:
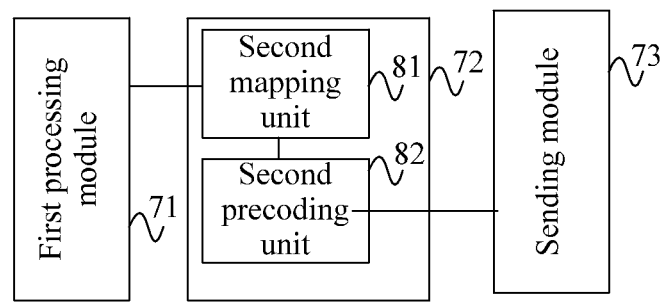
FIG. 8 is a schematic structural diagram of Embodiment 2 of a transmit node according to an embodiment of the present invention.

FIG. 8 is a schematic structural diagram of Embodiment 2 of a transmit node according to an embodiment of the present invention. As shown in FIG. 8, on the basis of the transmit node shown in FIG. 7, in the transmit node in this embodiment, the second processing module 72 includes:
a second mapping unit 81, configured to map the first data to second mapping data at second data layers, where a quantity of the second data layers is not greater than a quantity of antennas in the second antenna direction; and
a second precoding unit 82, configured to perform the second precoding processing on the second mapping data to generate the second data.

In an implementation manner of the transmit node shown in FIG. 8, if the second precoding processing is the second transmit diversity processing, the second mapping unit 81 is specifically configured to map the first data to the second mapping data at the second data layers, where each of the second data layers includes same data. The second precoding unit 82 is specifically configured to perform second transmit diversity precoding processing on the second mapping data to generate the second data; and perform, by using a second diversity precoding matrix with p rows and v columns, the second transmit diversity precoding processing on the second mapping data to generate the second data, where p is the quantity of antennas in the second antenna direction, v is the quantity of the second data layers, and v is not greater than p.

In another implementation manner of the transmit node shown in FIG. 8, if the second precoding processing is the second transmit spatial multiplexing processing, the second mapping unit 81 is specifically configured to divide the first data into u pieces of second subdata, where a quantity u of the pieces of the second subdata is not greater than the quantity of the second data layers; and map the u pieces of second subdata to the second mapping data at the second data layers, and map each piece of the second subdata into one second data layer. The second precoding unit 82 is specifically configured to perform second transmit spatial multiplexing precoding processing on the second mapping data to generate the second data; and perform, by using a second multiplexing precoding matrix with p rows and v columns, the second transmit spatial multiplexing precoding processing on the second mapping data to generate the second data, where p is the quantity of antennas in the second antenna direction, v is the quantity of the second data layers, and v is not greater than p.

The transmit node in this embodiment is used to implement the technical solution in Embodiment 2 of the data transmission method for a multi-antenna system shown in FIG. 2. An implementation principle and a technical effect of the transmit node are similar to those of the technical solution, and details are not described herein again.

Figure 9:
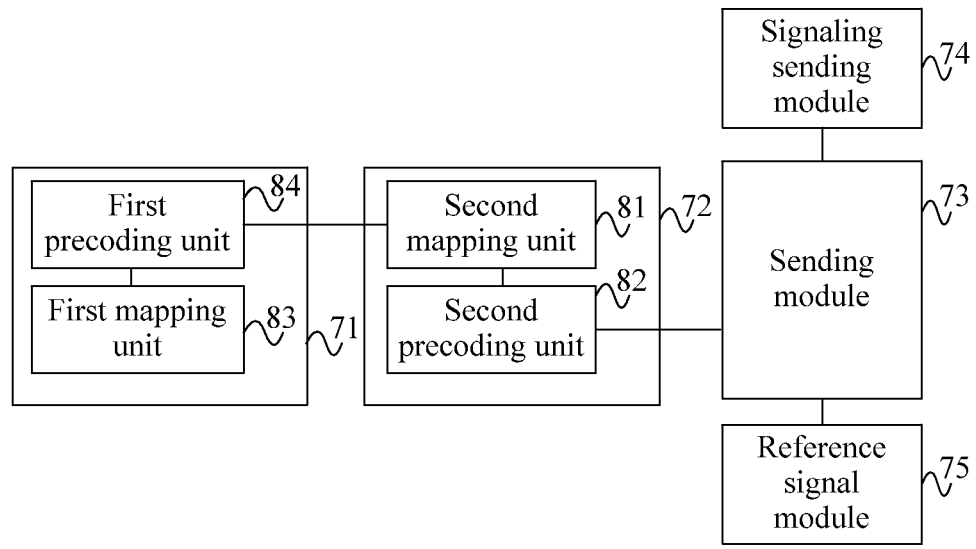
FIG. 9 is a schematic structural diagram of Embodiment 3 of a transmit node according to an embodiment of the present invention.

FIG. 9 is a schematic structural diagram of Embodiment 3 of a transmit node according to an embodiment of the present invention. As shown in FIG. 9, on the basis of the transmit node shown in FIG. 8, the transmit node in this embodiment further includes:

a signaling sending module 74, configured to send a quantity of the first data layers and the quantity of the second data layers to a receive node by using signaling; and a reference signal module 75, configured to perform the first precoding processing on a reference signal in the first antenna direction, and perform the second precoding processing on the reference signal in the second antenna direction, so as to generate a precoded reference signal; and send the precoded reference signal to the receive node.

The first processing module 71 includes: a first mapping unit 83 and a first precoding unit 84.

If the first precoding processing is the first transmit diversity processing, the first mapping unit 83 is configured to map the to-be-sent data to first mapping data at the first data layers, where the quantity of the first data layers is not greater than a quantity of antennas in the first antenna direction; and the first precoding unit 84 is configured to perform, by using a first diversity precoding matrix, first transmit diversity precoding processing on the first mapping data to generate the first data.

If the first precoding processing is the first transmit spatial multiplexing processing, the first mapping unit 83 is configured to divide the to-be-sent data into w pieces of first subdata, where a quantity w of the pieces of the first subdata is not greater than a quantity of first data layers, and the quantity of the first data layers is not greater than a quantity of antennas in the first antenna direction, and map the w pieces of first subdata to first mapping data at the first data layers, and map each piece of the first subdata into one first data layer. The first precoding unit 84 is configured to perform, by using a first multiplexing precoding matrix, first transmit spatial multiplexing precoding processing on the first mapping data to generate the first data.

The first antenna direction and the second antenna direction are spatially orthogonal to each other; or the first antenna direction and the second antenna direction are cross polarized at 45 degrees; or the first antenna direction and the second antenna direction are vertically polarized.

The reference signal is at least one of a CRS, a CSI-RS, and a DM-RS.

Figure 10:
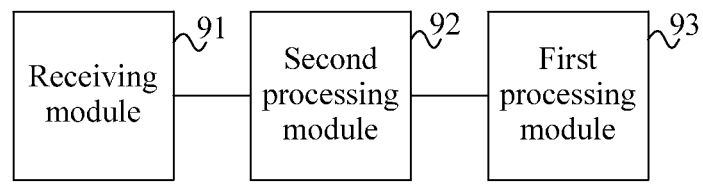
FIG. 10 is a schematic structural diagram of Embodiment 1 of a receive node according to an embodiment of the present invention.

FIG. 10 is a schematic structural diagram of Embodiment 1 of a receive node according to an embodiment of the present invention. As shown in FIG. 10, the receive node in this embodiment includes:

a receiving module 91, configured to receive second data that is sent by a transmit node by using a multi-antenna system, where the second data is generated by the transmit node after the transmit node performs second precoding processing on first data in a second antenna direction of the multi-antenna system, and the second antenna direction includes at least two antennas;

a second processing module 92, configured to perform second decoding processing on the second data to acquire the first data, where the first data is generated by the transmit node after the transmit node performs first precoding processing on to-be-sent data in a first antenna direction of the multi-antenna system, and the first antenna direction includes at least two antennas; and a first processing module 93, configured to perform first decoding processing on the first data to acquire the to-be-sent data; where when the first decoding processing is first receive diversity processing, the second decoding processing is second receive diversity processing or second receive spatial multiplexing processing; when the first decoding processing is first receive spatial multiplexing processing, the second decoding processing is second receive diversity processing.

The receive node in this embodiment is used to implement the technical solution in Embodiment 3 of the data transmission method for a multi-antenna system shown in FIG. 5. An implementation principle and a technical effect of the receive node are similar to those of the technical solution, and details are not described herein again.

Figure 11:
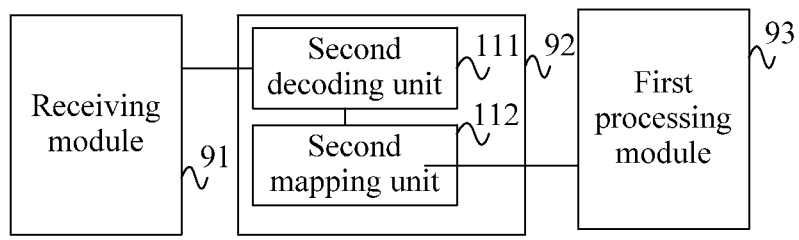
FIG. 11 is a schematic structural diagram of Embodiment 2 of a receive node according to an embodiment of the present invention.

FIG. 11 is a schematic structural diagram of Embodiment 2 of a receive node according to an embodiment of the present invention. As shown in FIG. 11, on the basis of the receive node shown in FIG. 10, in the receive node in this embodiment, the second processing module 92 includes:

a second decoding unit 111, configured to perform the second decoding processing on the second data to generate second mapping data at second data layers; and a second mapping unit 112, configured to perform an inverse mapping operation on the second mapping data according to a quantity of the second data layers to generate the first data, where the quantity of the second data layers is not greater than a quantity of antennas in the second antenna direction.

In an implementation manner of the receive node shown in FIG. 11, if the second decoding processing is the second receive diversity processing, the second decoding unit 111 is specifically configured to perform second receive diversity decoding processing on the second data to generate the second mapping data at the second data layers, where each of the second data layers includes same data; and perform, by using a second diversity precoding matrix with p rows and v columns, the second receive diversity decoding processing on the second data to generate the second mapping data at the second data layers, where p is the quantity of antennas in the second antenna direction, v is the quantity of the second data layers, and v is not greater than p.

In another implementation manner of the receive node shown in FIG. 11, if the second decoding processing is the second receive spatial multiplexing processing, the second decoding unit 111 is specifically configured to perform second receive spatial multiplexing decoding processing on the second data to generate the second mapping data at the second data layers, where each of the second data layers includes different data; and perform, by using a second multiplexing precoding matrix with p rows and v columns, the second receive spatial multiplexing decoding processing on the second data to generate the second mapping data at the second data layers, where p is the quantity of antennas in the second antenna direction, v is the quantity of the second data layers, and v is not greater than p. The second mapping unit 112 is specifically configured to perform the inverse mapping operation on the second mapping data according to the quantity of the second data layers to generate u pieces of second subdata, where a quantity u of the pieces of the second subdata is not greater than the quantity of the second data layers; and combine the u pieces of second subdata into the first data.

The receive node in this embodiment is used to implement the technical solution in Embodiment 4 of the data transmission method for a multi-antenna system shown in FIG. 6. An implementation principle and a technical effect of the receive node are similar to those of the technical solution, and details are not described herein again.

Figure 12:
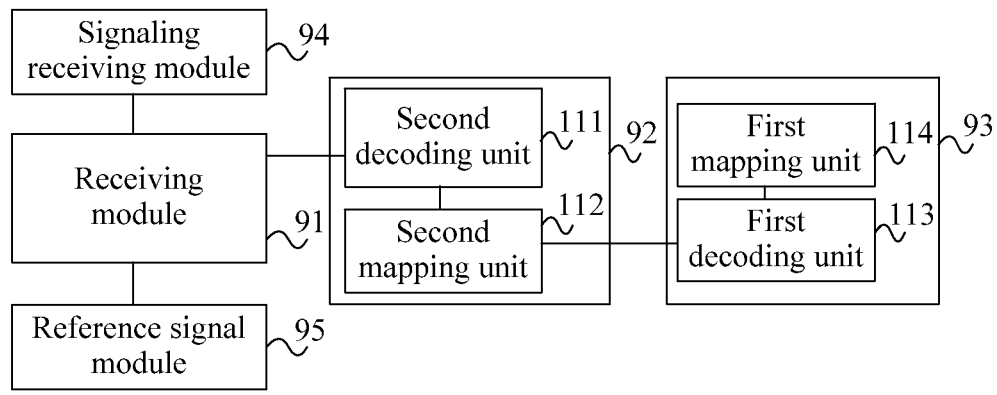
FIG. 12 is a schematic structural diagram of Embodiment 3 of a receive node according to an embodiment of the present invention.

FIG. 12 is a schematic structural diagram of Embodiment 3 of a receive node according to an embodiment of the present invention. As shown in FIG. 12, on the basis of the receive node shown in FIG. 11, the receive node in this embodiment further includes:

a signaling receiving module 94, configured to receive a quantity of the first data layers and the quantity of the second data layers that are sent by the transmit node by using signaling; and a reference signal module 95, configured to receive a precoded reference signal sent by the transmit node, where the reference signal is generated by the transmit node after the transmit node performs the first precoding processing on a reference signal in the first antenna direction and performs the second precoding processing on the reference signal in the second antenna direction.

The first processing module 93 includes: a first decoding unit 113 and a first mapping unit 114.

If the first decoding processing is the first receive diversity processing, the first decoding unit 113 is configured to perform, by using a first diversity precoding matrix, first receive diversity decoding processing on the first data to generate the first mapping data; and the first mapping unit 114 is configured to perform an inverse mapping operation on the first mapping data to generate the to-be-sent data.

If the first decoding processing is the first receive spatial multiplexing processing, the first decoding unit 113 is configured to perform, by using a first multiplexing precoding matrix, first receive spatial multiplexing decoding processing on the first data to generate the first mapping data; and the first mapping unit 114 is configured to perform an inverse mapping operation on the first mapping data according to the quantity of the first data layers to generate w pieces of first subdata, where a quantity w of the pieces of the first subdata is not greater than the quantity of the first data layers, and combine the w pieces of first subdata into the to-be-sent data.

The first antenna direction and the second antenna direction are spatially orthogonal to each other; or the first antenna direction and the second antenna direction are cross polarized at 45 degrees; or the first antenna direction and the second antenna direction are vertically polarized.

The reference signal is at least one of a cell-specific reference signal CRS, a CSI-RS, and a DM-RS.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A data transmission method for a multi-antenna system, comprising:
    performing first precoding processing on to-be-sent data in a first antenna direction of a multi-antenna system to generate first data, the performing the first precoding processing comprising mapping at least a portion of the to-be-sent data to first mapping data at first data layers, wherein the first antenna direction comprises at least two antennas configured to transmit or receive in the first antenna direction;
    performing second precoding processing on the first data in a second antenna direction of the multi-antenna system to generate second data, wherein the second antenna direction comprises at least two antennas configured to transmit or receive in the second antenna direction; and
    sending the second data to a receive node through each antenna port of the multi-antenna system;
    wherein, when the first precoding processing is first transmit diversity processing, the second precoding processing is at least one of second transmit diversity processing or second transmit spatial multiplexing processing; and
    wherein, when the first precoding processing is first transmit spatial multiplexing processing, the second precoding processing is second transmit diversity processing.

2. The method according to claim 1, wherein the performing second precoding processing on the first data in a second antenna direction of the multi-antenna system to generate second data comprises:
    mapping the first data to second mapping data at second data layers, wherein a quantity of the second data layers is not greater than a quantity of antennas in the second antenna direction; and
    performing the second precoding processing on the second mapping data to generate the second data.

3. The method according to claim 1, wherein the performing first precoding processing on to-be-sent data in a first antenna direction of a multi-antenna system to generate first data comprises performing at least one of:
- a first process comprising:
  - mapping, in response to the first precoding processing being the first transmit diversity processing, the to-be-sent data to the first mapping data at the first data layers, wherein a quantity of the first data layers is not greater than a quantity of antennas in the first antenna direction; and
  - performing, by using a first diversity precoding matrix, first transmit diversity precoding processing on the first mapping data to generate the first data; or
- a second process comprising:
  - dividing, in response to the first precoding processing being the first transmit spatial multiplexing processing, the to-be-sent data into w pieces of first subdata, wherein a quantity w of the pieces of the first subdata is not greater than a quantity of the first data layers, and wherein the quantity of the first data layers is not greater than a quantity of antennas in the first antenna direction;
  - mapping the w pieces of first subdata to the first mapping data at the first data layers, and mapping each piece of the first subdata into one first data layer; and
  - performing, by using a first multiplexing precoding matrix, first transmit spatial multiplexing precoding processing on the first mapping data to generate the first data.

4. The method according to claim 3, further comprising: sending the quantity of the first data layers and the quantity of the second data layers to the receive node by using signaling.

5. The method according to claim 1, further comprising: performing the first precoding processing on a reference signal in the first antenna direction, and performing the second precoding processing on the reference signal in the second antenna direction, so as to generate a precoded reference signal; and
sending the precoded reference signal to the receive node.

6. A data transmission method for a multi-antenna system, comprising:
- receiving second data that is sent by a transmit node by using a multi-antenna system, wherein the second data is generated by the transmit node after the transmit node performs second precoding processing on first data in a second antenna direction of the multi-antenna system, and the second antenna direction comprises at least two antennas configured to transmit or receive in the second antenna direction;
- performing second decoding processing on the second data to acquire the first data, wherein the first data is generated by the transmit node after the transmit node performs first precoding processing on to-be-sent data in a first antenna direction of the multi-antenna system, and the first antenna direction comprises at least two antennas configured to transmit or receive in the first antenna direction; and
- performing first decoding processing on the first data to acquire the to-be-sent data, wherein the second decoding processing comprises performing decoding processing on the first data to generate first mapping data, and performing an inverse mapping operation on the first mapping data to generate at least a portion of the to-be-sent data;
- wherein, when the first decoding processing is first receive diversity processing, the second decoding processing is second receive diversity processing or second receive spatial multiplexing processing; and
- wherein, when the first decoding processing is first receive spatial multiplexing processing, the second decoding processing is second receive diversity processing.

7. The method according to claim 6, wherein the performing second decoding processing on the second data to acquire the first data comprises:
- performing the second decoding processing on the second data to generate second mapping data at second data layers; and
- performing an inverse mapping operation on the second mapping data according to a quantity of the second data layers to generate the first data, wherein the quantity of the second data layers is not greater than a quantity of antennas in the second antenna direction.

8. The method according to claim 6, wherein the performing first decoding processing on the first data to acquire the to-be-sent data comprises performing at least one of:
- a first process comprising:
  - performing, by using a first diversity precoding matrix and in response to the first decoding processing being the first receive diversity processing, first receive diversity decoding processing on the first data to generate the first mapping data; and
  - performing an inverse mapping operation on the first mapping data to generate the to-be-sent data; or
- a first process comprising:
  - performing, by using a first multiplexing precoding matrix and in response to the first decoding processing being the first receive spatial multiplexing processing, first receive spatial multiplexing decoding processing on the first data to generate the first mapping data;
  - performing an inverse mapping operation on the first mapping data according to a quantity of a first data layers to generate w pieces of first subdata, wherein a quantity w of the pieces of the first subdata is not greater than the quantity of the first data layers; and
  - combining the w pieces of first subdata into the to-be-sent data.

9. The method according to claim 8, further comprising: receiving the quantity of the first data layers and the quantity of the second data layers that are sent by the transmit node by using signaling.

10. The method according to claim 6, further comprising: receiving a precoded reference signal sent by the transmit node, wherein the reference signal is generated by the transmit node after the transmit node performs the first precoding processing on a reference signal in the first antenna direction and performs the second precoding processing on the reference signal in the second antenna direction.

11. A transmit node, comprising:
a processor;
a non-transitory computer readable medium connected to the processor and having stored thereon instructions that, when executed by the processor, cause the processor to:
- perform first precoding processing on to-be-sent data in a first antenna direction of a multi-antenna system to generate first data, the instructions to perform the first precoding processing including instructions to map at least a portion of the to-be-sent data to first mapping data at first data layers, wherein the first antenna direction comprises at least two antennas configured to transmit or receive in the first antenna direction; and perform second precoding processing on the first data in a second antenna direction of the multi-antenna system to generate second data, wherein the second antenna direction comprises at least two antennas configured to transmit or receive in the second antenna direction; and a sending module, configured to send the second data to a receive node through each antenna port of the multi-antenna system;

wherein, when the first precoding processing is first transmit diversity processing, the second precoding processing is second transmit diversity processing or second transmit spatial multiplexing processing; and wherein, when the first precoding processing is first transmit spatial multiplexing processing, the second precoding processing is second transmit diversity processing.

12. The transmit node according to claim 11, wherein instructions causing the processor to perform second precoding processing comprises instructions, that when executed, cause the processor to:

map the first data to second mapping data at second data layers, wherein a quantity of the second data layers is not greater than a quantity of antennas in the second antenna direction; and perform the second precoding processing on the second mapping data to generate the second data.

13. The transmit node according to claim 11, wherein instructions causing the processor to perform first precoding processing comprises instructions, that when executed, cause the processor to:

execute, in response to the first precoding processing being the first transmit diversity processing, instructions causing the processor to:

map the to-be-sent data to the first mapping data at the first data layers, wherein a quantity of the first data layers is not greater than a quantity of antennas in the first antenna direction; and perform, by using a first diversity precoding matrix and further in response to the first precoding processing being the first transmit diversity processing, first transmit diversity precoding processing on the first mapping data to generate the first data; or execute, in response to the first precoding processing being the first transmit spatial multiplexing processing, instructions causing the processor to:

divide, in response to the first precoding processing being the first transmit spatial multiplexing processing, the to-be-sent data into w pieces of first subdata, wherein a quantity w of the pieces of the first subdata is not greater than a quantity of first data layers, and the quantity of the first data layers is not greater than a quantity of antennas in the first antenna direction, and map the w pieces of first subdata to the first mapping data at the first data layers;

map each piece of the first subdata into one first data layer; and perform, by using a first multiplexing precoding matrix, first transmit spatial multiplexing precoding processing on the first mapping data to generate the first data.

14. The transmit node according to claim 13, further comprising:

a signaling sending module, configured to send the quantity of the first data layers and the quantity of second data layers to the receive node by using signaling.

15. The transmit node according to claim 11, wherein the non-transitory computer readable medium further has stored thereon instructions that, when executed by the processor, cause the processor to:

perform the first precoding processing on a reference signal in the first antenna direction, and perform the second precoding processing on the reference signal in the second antenna direction, so as to generate a precoded reference signal; and send the precoded reference signal to the receive node.

16. A data transmission method for a multi-antenna system, comprising:

performing first precoding processing on to-be-sent data in a first antenna direction of a multi-antenna system to generate first data, the performing the first precoding processing comprising mapping at least a portion of the to-be-sent data to first mapping data at first data layers, wherein the first antenna direction comprises at least two antennas configured to transmit or receive in the first antenna direction;

mapping the first data to second mapping data at second data layers, wherein a quantity of the second data layers is not greater than a quantity of antennas in a second antenna direction;

performing second precoding processing on the second mapping in data the second antenna direction of the multi-antenna system to generate second data, wherein the second antenna direction comprises at least two antennas configured to transmit or receive in the second antenna direction; and sending the second data to a receive node through each antenna port of the multi-antenna system wherein the second precoding processing is at least one of second transmit diversity processing or second transmit spatial multiplexing processing and is selected according to the first precoding processing.

17. The method according to claim 16, wherein the performing the first precoding processing comprises performing at least one of:

a first process comprising:

mapping, in response to the first precoding processing being first transmit diversity processing, the to-be-sent data to the first mapping data at the first data layers, wherein a quantity of the first data layers is not greater than a quantity of antennas in the first antenna direction; and performing, by using a first diversity precoding matrix, first transmit diversity precoding processing on the first mapping data to generate the first data; or a second process comprising:

dividing, in response to the first precoding processing being first transmit spatial multiplexing processing, the to-be-sent data into w pieces of first subdata, wherein a quantity w of the pieces of the first subdata is not greater than a quantity of the first data layers, and wherein the quantity of the first data layers is not greater than a quantity of antennas in the first antenna direction;

mapping the w pieces of first subdata to the first mapping data at the first data layers, and mapping each piece of the first subdata into one first data layer; and performing, by using a first multiplexing precoding matrix, the first transmit spatial multiplexing precoding processing on the first mapping data to generate the first data.

18. The method according to claim 17, further comprising:
sending the quantity of the first data layers and the quantity of the second data layers to the receive node by using signaling.

19. The method according to claim 16, further comprising:
performing the first precoding processing on a reference signal in the first antenna direction, and performing the second precoding processing on the reference signal in the second antenna direction, so as to generate a precoded reference signal; and
sending the precoded reference signal to the receive node.

20. The method according to claim 16, wherein, when the first precoding processing is first transmit diversity processing, the second precoding processing is at least one of second transmit diversity processing or second transmit spatial multiplexing processing.

* * * * *